United States Patent Office 3,004,341
Patented Oct. 17, 1961

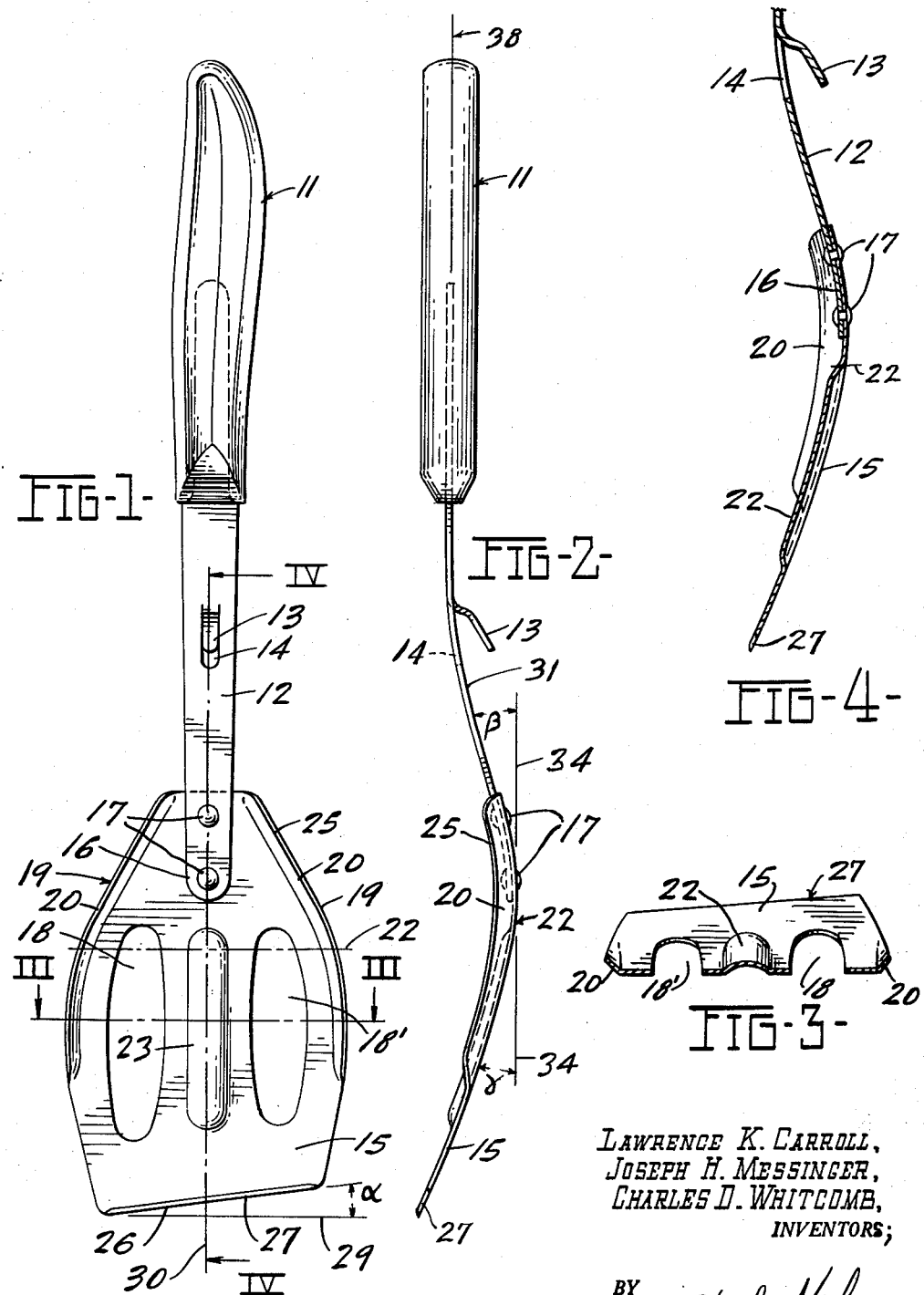

3,004,341
KITCHEN UTENSIL
Lawrence K. Carroll, Joseph H. Messinger, and Charles D. Whitcomb, Fremont, Ohio, assignors to Quikut, Inc., Fremont, Ohio, a corporation of Ohio
Filed Dec. 11, 1959, Ser. No. 858,978
2 Claims. (Cl. 30—325)

This invention relates to a kitchen utensil. More particularly, it deals with a combination spatula, cutter, and folding, blending, draining and mixing spoon, which has particular advantages in making angel food and chiffon type cakes.

One state in the baking of angel food cakes requires that the dry ingredients, flour, powdered sugar, etc., be folded into beaten egg whites. This operation is critical to the success of an angel food cake. One commonly accepted standard of achievement in the baking of angel food cakes is the highness, lightness, or fluffiness of such cakes. Such lightness is dependent on how thoroughly and how gently the dry ingredients are folded into the beaten egg whites. It is quite common for a skilled and talented cook to produce a very stiff and high batch of beaten egg white and yet, upon completion of the cake, the finished product is low and heavy looking. Thus, the appearance of the cake is the direct result of how poorly or how well the dry material is folded into the beaten egg whites.

If the dry material is not folded thoroughly into the beaten egg whites, a non-uniform texture is produced in the finished cake. If the egg whites are handled too much or too roughly, the beaten egg whites lose their stiffness and a low cake results. It is thus evident that the cook desires to fold the dry ingredients into the beaten egg whites, but with the least number of folding motions. With existing utensils, it requires approximately 15 folds to each stage (there being four stages, fold ¼ of the dry ingredients at a time). With this utensil the same degree of mixing can be accomplished in approximately 10 folds to each stage, thereby producing a higher and lighter mixture, with a resulting higher and lighter cake because the egg whites have retained their stiffness.

It is an object of this invention to provide a new, simple, efficient, economic, effective and easy to handle multi-purpose kitchen utensil which may be used in mixing, folding, scraping, cutting, blending, baking, draining, and cooking.

Another object of this invention is to provide such a utensil for quickly and effectively folding whipped materials into batters or other substances.

Generally speaking this invention comprises a kitchen utensil having a handle, a flat and preferably slightly flexible, non-corrosive blade, and a stem, which may be curved or not, connecting said handle and said blade. The stem may be integral with either or both the handle and the blade and may also be provided with a hook for hanging the utensil to the edge of a bowl, pan or pot. The blade and preferably also the stem may be made of a sheet metal, preferably stainless steel.

The blade is longitudinal and non-symmetrical, having its wider portion intermediate its ends and tapering more toward the stem or handle end than the other or outer end of the blade. The blade intermediate its ends may be bent at an obtuse angle to facilitate gripping the handle when used for scraping a flat surface. The handle end portion of the longitudinal blade also may be provided with flanges which together with the transverse bend in the blade form an upwardly concave or spoon type section. The longitudinal axis of the blade may be provided with a reinforcing rib which preferably is convex upwardly so as to provide a smooth rear surface to the back of the blade. On either side of the longitudinal center line of the blade are provided a pair of longitudinally parallel apertures particularly adapted for folding and draining. Across the outer edge of the blade is provided a straight cutting edge which may be bevelled and/or ground and which extends at an acute angle to a perpendicular to the longitudinal center line of the blade, which angle aids in its use as a scraper for lifting first one corner of cookies from a cookie sheet.

The above mentioned and other features and objects of this invention and the manner of attaining them will become more apparent and the invention itself will be best understood by reference to the following description of an embodiment of the invention taken in conjunction with the accompanying drawing, wherein:

FIG. 1 is a top plan view of the utensil of this invention showing the blade concave upward;

FIG. 2 is a right side view of the utensil shown in FIG. 1;

FIG. 3 is a cross-sectional view taken along the axis III—III in FIG. 1; and

FIG. 4 is a cross-sectional view taken along the axis IV—IV in FIG. 1.

Referring to the drawing the specific embodiment of the utensil shown comprises a handle 11, preferably of a low thermal conducting material, such as wood or plastic, which is attached, or if of plastic may be integral with the end of the stem 12, which stem may be bent as shown in FIG. 2 and may also be provided with a hook or holding clip 13. This hook 13 may be formed by stamping out a sheet metal strip of the stem to produce the aperture 14, and may be used to engage the edge of a pot or pan to hold the spoon from sliding or falling into the pot or pan and material therein. Attached to the other end of the stem portion 12 is the blade 15 which may be connected to the end 16 of the stem by means of rivets 17 or may be welded or otherwise attached or connected thereto, or made integral therewith from the same sheet of material.

The blade itself is unsymmetrically shaped having therein two large apertures 18 and 18′, the former in the embodiment shown being larger than the latter. The ratio of the area of these apertures to the total projected area of the blade 15 is particularly important for quick and effective folding of chiffon type batters. The combined width of these apertures 18 and 18′ thus is approximately one third of the projected width of the blade 15. If the apertures 18 and 18′ are too large the material to be folded passes through them too readily and is inefficiently handled. If the apertures are too small then the utensil serves more as a paddle and does not produce the desired folding effect when used as a folding spoon.

The edges 19 of the blade nearer the stem 12 preferably are provided with flanges 20 which may be integral with the blade, and which, together with the smooth knuckle or bend along the transverse line 22 between the ends of the blade, form an upwardly concave or spoon type section of the utensil. Longitudinally and centrally of the blade there may be provided a reinforcing rib 23 which preferably is also raised from the upper surface of the blade as are the flanges 20, and together therewith further reinforces the blade to reduce its flexibility, particularly at the stem end 25 thereof, as distinguished from the opposite and outer end 26 where a slight amount of flexibility is desirable.

The side edges 19 of the blade preferably converge more toward the stem end 25 than at the other and outer end 26, which outer end 26 preferably is bevelled and/or ground to provide a cutting and straight edge 27 at an angle α to the perpendicular 29 to the longitudinal center line 30 of the utensil.

The stem 12 may be bent as shown at 31 in FIG. 2 so as to provide an angle $\beta$ with the line 34 parallel with the center line 38 of the axis of the handle 11, and the bend along the line 22 may provide an angle $\gamma$ on the other side of the bend 22 with the lines 34. Thus angles $\beta$ and $\gamma$ collectively lie within a range between about 15° and 25°. The angle made by the cutting edge 27 with the line 29 perpendicular to the center line 30, preferably ranges between about 5° and 10°. That is an angle $\alpha$ convenient for a right-handed person holding and operating the tool so that one edge of a cookie on a sheet, or whatever is being scraped up by the cutting or spatula edge 27 of the tool, is first lifted only at a corner so as not to break the cookie and also to aid in the insertion of the tool thereunder.

The combination of the rib 23 and the flanges 20 serves to guide the material to be folded through these apertures in a gentle manner and facilitates in a thorough mixing of the two materials. The concavity produced by the angles $\beta$ and $\gamma$ further serves to channel the material to be folded through the apertures 18 and 18', and yet does not beat this material any farther, thus maintaining its stiffness. It is preferred that the rib 23 be raised in the same direction in which the blade is concave, however, this rib may be on the reverse side of the blade 15.

As a result of the considerations necessary to assure the optimum efficiency of this utensil in folding whipped materials into liquids, this utensil is also well adapted for other uses in the kitchen. The essentially flat portion of the blade 15 permits the efficient use of the utensil as a spatula or lifting tool when lifting cookies from cookie sheets, fried or poached eggs from skillets, and similar uses in a kitchen.

When the cutting edge 27 is incorporated in the utensil described, said utensil may be conveniently used to subdivide and cut baked goods such as "brownies," sheet cakes, pies, and other similar kitchen products.

While there is described above the principles of this invention in connection with specific apparatus, it is to be clearly understood that this description is made only by way of example and not as a limitation to the scope of this invention.

What is claimed is:

1. A combination kitchen utensil comprising: a handle; a longitudinal asymmetrical blade; and a stem connecting said handle and said blade; said blade having a bend transversely thereof between the ends of said blade producing a concavity in an upward direction and on opposite sides of said bend a handle end section and a spatula end section of said blade, each of said sections having substantial flat portions therein, said blade having a flanged rim extending along the periphery of the handle-end portion of said blade spoon portion, said blade having an integral reinforcing rib along the longitudinal axis of said utensil, said blade also having two longitudinally oriented oblong apertures disposed one on each side of said rib with each aperture being substantially centrally disposed between said rib and the edge of said blade, said apertures being of a combined width approximately one third the total width of said blade, said rib and said apertures in said blade forming a blending and draining portion of said utensil, and said blade having a cutting edge located at the outer end of said spatula section of said blade away from said stem and handle, said edge being disposed at an acute angle to the perpendicular to the longitudinal axis of said utensil.

2. A combination kitchen utensil, comprising: a handle, a longitudinally asymmetrical cylindrical blade having the axis of the cylinder transverse of said handle, sharply bent flanges raised from said blade around the semi-periphery of said blade adjacent said handle, to form a spoon portion, said blade having a single integral reinforcing rib raised therefrom along the longitudinal axis of said utensil, said blade also having two longitudinally oriented elliptical apertures disposed one on each side of said rib with the combined width of said apertures equalling approximately one-third the width of said blade to form a blending and draining portion, and said blade having a spatula portion with a cutting edge located at the end opposite from said handle with the cutting edge being bevelled toward the upper concave surface of said blade.

References Cited in the file of this patent

UNITED STATES PATENTS

| 275,112 | Aldom | Apr. 3, 1883 |
| 631,713 | Goodwin | Aug. 22, 1899 |
| 1,228,821 | Reynolds | June 5, 1917 |

FOREIGN PATENTS

| 12,801 | Great Britain | June 15, 1908 |
| 321,868 | Great Britain | Nov. 21, 1921 |
| 518,035 | Great Britain | Feb. 15, 1940 |

OTHER REFERENCES

Breck's of Boston, Xmas Gift Catalogue of 1950, page 24, Design Division.